United States Patent [19]
Perry

[11] Patent Number: 5,365,459
[45] Date of Patent: Nov. 15, 1994

[54] CONTINUOUS STACK FLOW RATE MONITOR

[76] Inventor: Robert E. Perry, P.O. Box 1607, Pelham, Ala. 35124

[21] Appl. No.: 840,529

[22] Filed: Feb. 25, 1992

[51] Int. Cl.$^5$ ............................................. G01M 19/00
[52] U.S. Cl. ................................. 364/509; 364/506; 364/510; 73/168
[58] Field of Search ................ 364/509, 506, 551.01, 364/510; 110/162; 73/168, 861.36, 861.37, 861.38, 861.44

[56] References Cited

U.S. PATENT DOCUMENTS

| | | | |
|---|---|---|---|
| 3,054,288 | 9/1962 | Bowman et al. | 73/168 |
| 3,733,900 | 5/1973 | DeBaun | 73/168 |
| 3,756,079 | 9/1973 | November | 73/861.36 |
| 4,204,832 | 5/1980 | Miller | 110/162 |
| 5,050,092 | 9/1991 | Perry | 364/506 |

OTHER PUBLICATIONS

"Flow Measurement and Control Handbook and Encyclopedia"; Turbing Flowmeters, pp. F-3 to F-8; 1985/1986.

*Primary Examiner*—Ellis B. Ramirez
*Attorney, Agent, or Firm*—Veal & Associates

[57] ABSTRACT

A stack flow rate measurement system and method utilizes the measured temperatures and pressures of the flue gases in a stack and the measured power supplied to a fan to calculate and display flue gas flow rate without direct measurement of gas velocities in the stack.

10 Claims, 2 Drawing Sheets

CONTINUOUS STACK FLOW RATE MONITOR

BACKGROUND OF THE INVENTION

The present invention relates to the measurement of fans in industrial applications with various industrial processes. In my prior U.S. Pat. No. 5,050,092, incorporated herein by reference, I disclosed a method and apparatus by which the fan efficiency of such fans can be measured in a non-invasive manner, which did not require direct interaction with the fan. It is also useful to know the flow rate through such fans to determine the quantity of gas and gas carried matter through the system. Direct gas velocity measurements are difficult to monitor in a dirty flue gas duct system, because velocity sensors are prone to plug, corrode, and generally deteriorate as a result of the continuous exposure to flue gas, however, temperature and pressure readings can be obtained with reliability in such a system.

There exists a need for a simple unit capable of measuring the parameters selected to determine flow rate on a substantially instantaneous and incremental basis to determine flow rate without affecting fan performance.

SUMMARY OF THE INVENTION

It is the object of the present invention to provide a method and apparatus which will provide measurement of stack flow rate in an industrial setting without use of velocity measuring devices which are subject to inaccuracies and without direct interaction with the fan.

More particularly it is the object of this invention to use a computed fan efficiency with a measured horsepower input to a fan to determine the stack flow rate of the flue gases.

The foregoing objects and other advantages are obtained by utilizing the fan efficiency measurement apparatus and techniques as disclosed in U.S. Pat. No. 5,050,092 and using a preprogrammed computer to determine flow rate based on a measured input power to the fan. The fan motor is generally connected to the fan with a coupling which directly fastens the motor and fan shafts. The losses through such a coupling are very low and the power transmitted is directly proportional to the motor output times the motor efficiency which is specified by the motor manufacturer. Consequently motor output can be determined by measurements of parameters associated with the motor. If a fluid coupling or other device besides a direct coupling is used to connect the fan and motor shafts, then the efficiency of the coupling device must be preprogrammed into the computer to yield an accurate result.

BRIEF DESCRIPTION OF THE DRAWINGS

Apparatus embodying features of my invention and used in my method are depicted in the accompanying drawings which form a portion of this disclosure, and wherein.

DESCRIPTION OF A PREFERRED EMBODIMENT

Figure 1:
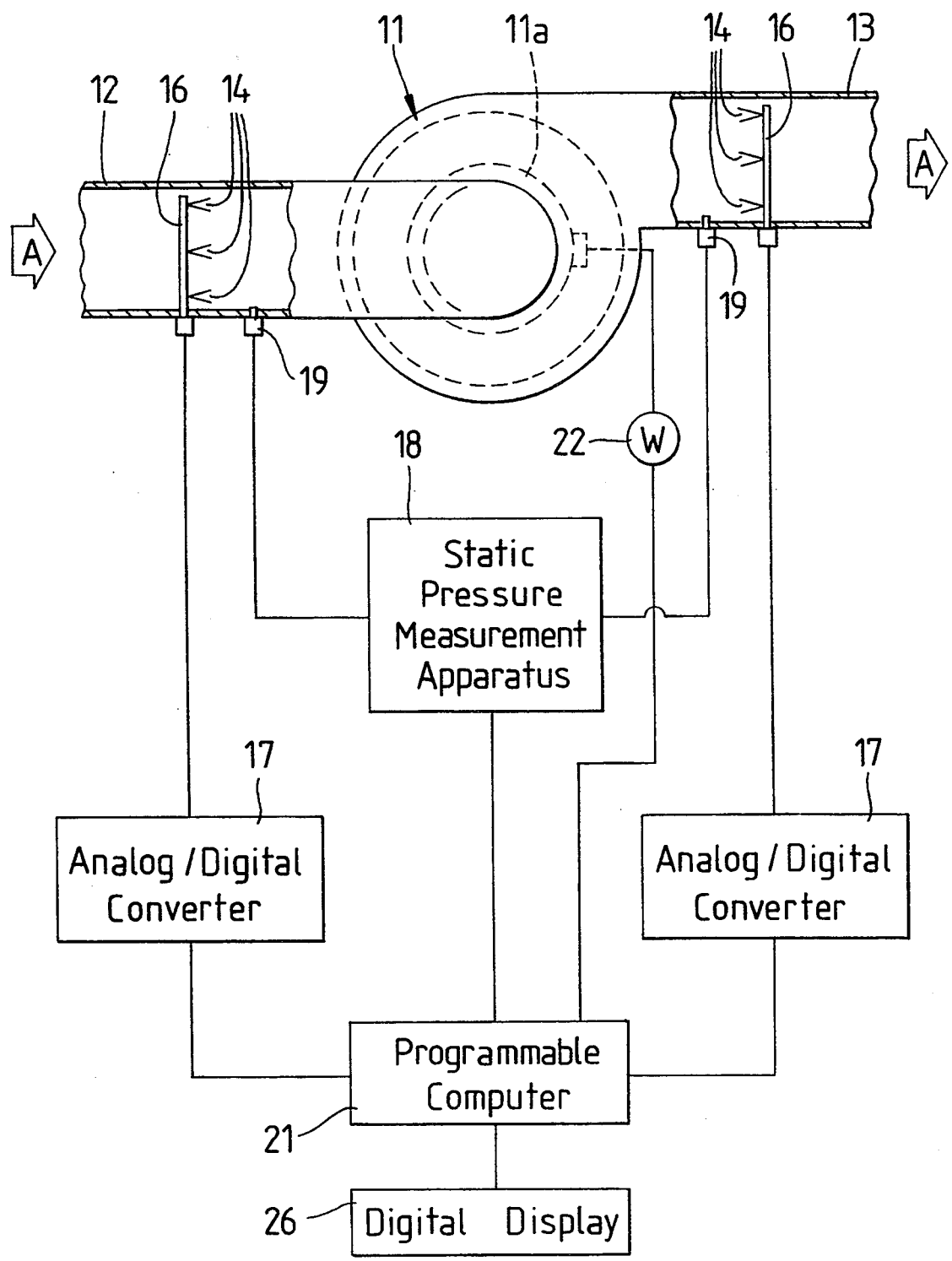
FIG. 1 is a schematic block diagram of the major components of the invention.

Referring to the drawings for a clearer understanding of the invention it may be seen that in FIG. I, that I depict a fan 11 in a system including air handling ducts 12 and 13 through which the air or gas is urged by the fan. The arrow A depicts the direction of air flow through the system. Duct 12 is the fan inlet and has mounted therein a plurality of temperature sensing devices 14, such as thermocouples, which generate an analog electrical signal in accordance with the temperature sensed. As will be understood the size of the ductwork will affect the number of thermocouples used, however it should be noted that a minimum of six thermocouples should be located at the inlet and at the outlet of the fan 11. The thermocouples 14 should be mounted on rigid support brackets 16 to support the thermocouples inside the ducts and to isolate the thermocouples 14 from the duct as much as possible.

The analog electrical output of each thermocouple is converted to a digital electrical signal in an associated analog to digital converter 17 and output of these converters are averaged to yield a signal indicative of the average inlet temperature, $T_1$, and a signal indicative of the average outlet temperature, $T_2$. Such averaging may be accomplished externally of the ductwork at a designated monitoring station having an appropriate digital summing network therein or may be done in a programmable computer 21. In the former manner the computer can be programmed to iteratively sample the average output of the summing network to obtain the $T_1$ and $T_2$ values. In the alternative the computer may compute $T_1$ and $T_2$ from plural signals coincidentally acquired from sample and hold registers associated with each A/D converter, which are well known and are not shown in the interest of clarity.

Pressure is measured by a conventional static pressure measurement apparatus 18 which is well known and a plurality of standard pressure taps 19 mounted on the sidewalls of ducts 12 and 13 on either side of the fan 11. Again a digital electrical signal representative of the pressure ($P_1$) in inches water gauge is output to the computer 21.

In addition to the above parameters the output power to the fan must be determined to calculate the flow rate. Output power to the fan may be determined in a variety of ways. In the embodiment shown in FIG. 1 the electrical power in kilowatts supplied to the motor 11a which drives the fan is measured directly from the circuitry using a kilowatt meter 22. The motor efficiency and the coupling efficiency as identified by the motor manufacturer and coupling manufacturer can then be used to determine how much power is output to the fan.

Figure 2:
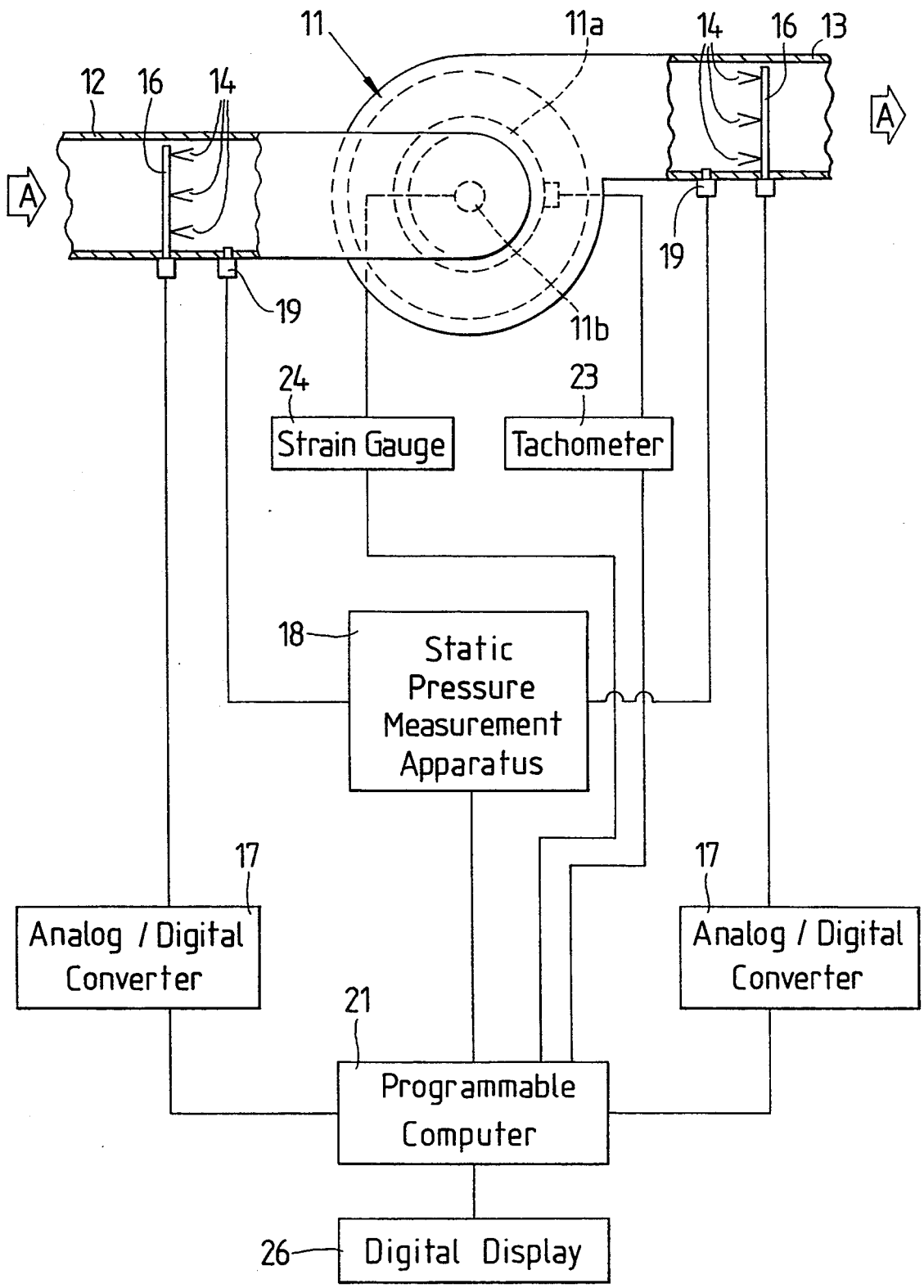
FIG. 2 is a schematic block diagram of an alternate embodiment of the invention.

In the embodiment shown in FIG. 2 the revolutions per minute of the motor shaft 11b is measured using a known device such as a tachometer 23 and a strain gauge 24 is operably attached to the shaft 11b to determine the torque on the shaft. The product of the torque and the revolutions per minute yields the power output by the motor 11a. These measurements are digitally input into the computer 21 also.

When the power to the fan and the efficiency of the fan is known then the computer is able to calculate and display a flow rate for the flue gases through the fan. Flow rates for multiple fan applications may be summed to give the total of a particular application.

The computer shown diagrammatically at 21 may be any suitable microprocessor based computer programmed to calculate the flow rate through the fan using the formula:

$$\text{Fan Flow Rate} = \frac{(P_m)\,(F)\,(C_o)\,T_1\,[(K-1)/K]}{(T_2 - T_1)\,(P_1)}$$

where:

$T_1$ = the inlet temperature in degrees Fahrenheit plus 460° F.

$T_2$ = the outlet temperature in degrees Fahrenheit plus 460°

$P_1$ = the inlet static pressure in inches water gauge plus 406.9 inches $K$ = the ratio of gas specific heat at constant pressure to constant volume, about 1.67 for gases; 1.4 for diatomic gases and values which approach unity for polyatomic gases $T_2 - T_1$ represents the measured temperature differential of the gas induced through the fan $F$ = the rated efficiency of the coupling or the coupling and the motor depending on whether $P_m$ is measured at the output or input of the motor $P_m$ = the measured power $C_o$ = a conversion constant for converting the measured power to a flow rate, for example where $P_m$ is measured in kilowatts then the $C_o = 8523.4$.

From the foregoing it may be seen that the invention does not require direct measurement of gas velocity in the stack or the extraction of a sample gases for processing in an external device. Only the inlet and outlet temperatures, inlet pressure and motor power measurements are required for computation of flow rate by computer 21. Thus the computer 21 can instantaneously display a flow rate for any stack equipped with the measuring devices and thus an operator can readily evaluate the operation of the fan as well as the discharge of effluents in the flue gases. This rate is readily displayed by a conventional display 26 associated with the computer and a conventional keypad may be used to input data or commands to the computer.

While I have shown my invention in various forms, it will be obvious to those skilled in the art that it is not so limited but is susceptible of various changes and modifications without departing from the spirit thereof.

What I claim is:

1. Apparatus for calculating and displaying the flow rate of flue gases through a fan in a stack comprising:
   (a) first sensing means for sensing average air temperature within a stack on the discharge side of a motor driven fan including a plurality of thermocouples mounted within said stack;
   (b) second means for sensing average air temperature within a stack on an inlet side of said fan comprising a plurality of thermocouples mounted within said stack;
   (c) means for sensing the pressure at said inlet side of said fan;
   (d) means for determining the power output of said motor;
   (e) means operatively connected to said first and second temperature sensing means, said pressure sensing means, said power determining means to receive signals derived from the parameters measured thereby for converting said signals to a measurement of the rate of flow of flue gases through said fan based on the formula $$\text{Fan Flow Rate} = \frac{(P_m)\,(F)\,(C_o)\,T_1\,[(K-1)/K]}{(T_2 - T_1)\,(P_1)}$$

where:

$T_1$ = the inlet temperature in degrees Fahrenheit plus 460° F., $T_2$ = the outlet temperature in degrees Fahrenheit plus 460°, $P_1$ = the inlet static pressure in inches water gauge plus 406.9 inches, $K$ = the ratio of gas specific heat at constant pressure to constant volume, $T_2 - T_1$ represents the measured temperature differential of the gas induced through the fan, $F$ = the rated efficiency of the coupling or the coupling and the motor depending on whether $P_m$ is measured at the output or input of the motor, $P_m$ = the measured power, $C_o$ = a conversion constant for converting the measured power to a flow rate; and (f) means for displaying said stack flow.

2. Apparatus as defined in claim 1 wherein said means for determining comprises a kilowatt meter operably connected to measure the power input to a motor operatively connected to drive said fan.

3. Apparatus as defined in claim 1 wherein said means for determining comprises means for determining the revolutions per minute of said fan and means for determining the torque on a shaft driving said fan through concomitant rotation therewith.

4. Apparatus as defined in claim 1 wherein said means for converting comprises a programmable computer programmed to receive said signals and respectively calculate the fan efficiency based thereon and output a signal indicative thereof to said display means.

5. Apparatus as defined in claim 4 further comprising analog to digital conversion means associated with said thermocouples for converting the output of each thermocouple into a signal indicative of the temperature sensed thereby.

6. Apparatus as defined in claim 4 wherein said display means is a visible digital display.

7. A method for determining the flow rate of flue gases through a motor driven fan in conduit comprising the steps of:
   (a) measuring the temperature differential of the flue gases across said fan within said conduit;
   (b) measuring the inlet pressure of the gases incident to said fan;
   (c) determining the power input to said fan;
   (d) electronically calculating the flow rate through said fan using a programmable computer adapted to receive signals indicative of said measured temperature differential, said measured pressure, and said power and programmed to utilize the formula $$\text{Fan Flow Rate} = \frac{(P_m)\,(F)\,(C_o)\,T_1\,[(K-1)/K]}{(T_2 - T_1)\,(P_1)}$$

where:

$T_1$ = the inlet temperature in degrees Fahrenheit plus 460° F., $T_2$ = the outlet temperature in degrees Fahrenheit plus 460°, $P_1$ = the inlet static pressure in inches water gauge plus 406.9 inches, K = the ratio of gas specific heat at constant pressure to constant volume, $T_2 - T_1$ represents the measured temperature differential of the gas induced through the fan, F = the rated efficiency of the coupling or the coupling and the motor depending on whether $P_m$ is measured at the output or input of the motor, $P_m$ = the measured power, $C_o$ = a conversion constant for converting the measured power to a flow rate; and (d) displaying said flow rate on a visually perceptible display.

8. The method as defined in claim 7 wherein said power is determined in kilowatts by measuring the input power to a motor driving said fan.

9. The method as defined in claim 7 wherein said power is determined based on the torque and revolutions per minute measured on a shaft driving said fan.

10. The method as defined in claim 7 wherein the flow rate of a plurality of fans are summed.

* * * * *